Sept. 27, 1927.
E. PORTER
1,643,420
REAR VIEW MIRROR FOR AUTOMOBILES
Filed Jan. 2, 1925
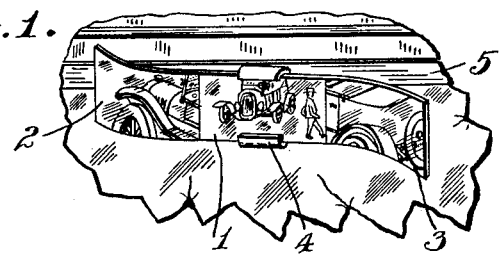
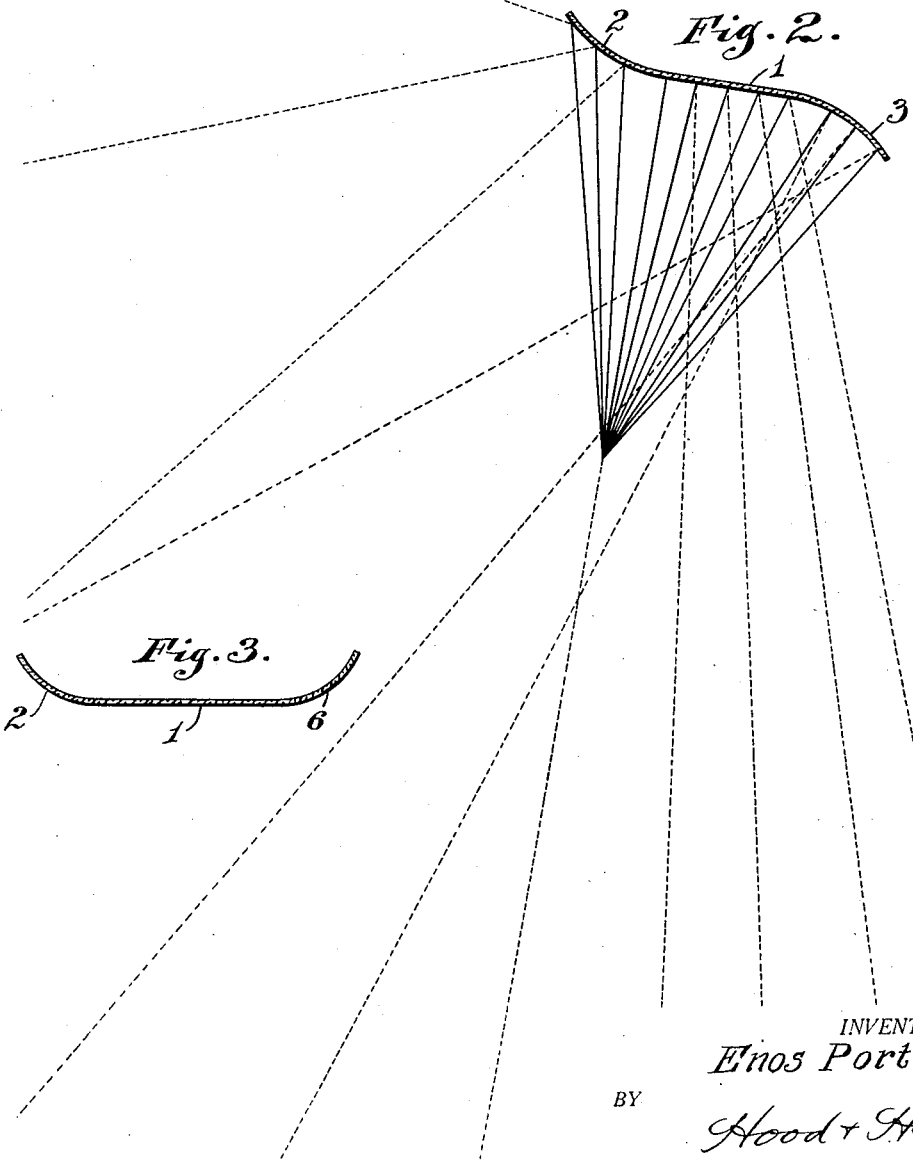
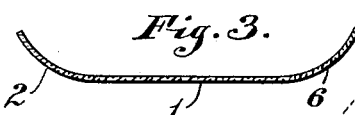
INVENTOR.
Enos Porter,
BY
Hood & Hahn
ATTORNEYS Patented Sept. 27, 1927.

1,643,420

UNITED STATES PATENT OFFICE.

ENOS PORTER, OF SHELBYVILLE, INDIANA.

REAR-VIEW MIRROR FOR AUTOMOBILES.

Application filed January 2, 1925. Serial No. 83. REISSUED

My invention relates to improvements in rear view mirrors for automobiles and the like.

In such mirrors as have been heretofore in use as rear view mirrors for automobiles, while the driver has been able to see the reflection of a car or other object at the rear of his car, he has not been able to observe objects to one side of and to the rear of the car, and particularly cars which are overtaking him and passing.

It is one of the objects of my invention to provide a "rear view" mirror by which the driver may not only observe cars in the rear of his car but also observe cars overtaking and passing him and objects adjacent the rear and to one side of the car.

For the purpose of disclosing my invention I have illustrated one embodiment thereof in the accompanying drawing in which, Fig. 1 is a perspective view of a mirror embodying my invention attached to the front windshield of an automobile;

Fig. 2 is a transverse section of the mirror showing particularly the lines of reflection, and Fig. 3 is a transverse section of a modified form of my invention.

As illustrated in the drawing, my mirror comprises a substantially straight or flat middle mirror section 1 having on one end a convex mirror portion 2 and on the opposite end a concave mirror portion 3, the whole forming a transversely elongated mirror which is adapted to be supported by suitable brackets 4 on the windshield 5, or in any other suitable place on an automobile in front of the driver. By this arangement the driver is enabled to observe objects in the rear, as shown in Fig. 1, in the substantially flat reflecting portion 1, and objects to one side, as shown in Fig. 1, in the convex portion 2 and concave portion 3.

It is obvious that for right hand drive cars and for other purposes, if desired, the mirror may be reversed to place the convex portion 2 of the mirror to the right.

In some instances it is desirable that the person sitting beside the driver may observe cars approaching from the rear and to one side and in this event I provide a convex end portion 6 instead of a concave end portion 3. It is also obvious that various other arrangements of the end mirrors may be provided, as for instance, instead of having one mirror concave and the other convex, both may be convex.

I claim as my invention:

1. A rear view mirror for vehicles comprising in a unitary structure a substantially flat reflecting surface and a concave reflecting surface at one end thereof, said mirror being mounted on a front wall of the vehicle and in a position to give to the driver a view in said mirror of objects at the rear and side of said vehicle.

2. A rear view mirror for vehicles comprising a rigid mirror having in a unitary structure a substantially flat reflecting surface and a convex reflecting surface at one end of said flat surface and means for supporting the mirror on a front wall of the vehicle in a position to reflect therein objects at the back and side of said vehicle.

3. A rear view mirror for vehicles comprising a rigid mirror having in a unitary structure a substantially flat center section, a concave section at one end of said center section and a convex section at the opposite end of said center section and means for supporting the mirror on a front wall of said vehicle in a position to reflect therein objects at the rear and side of said vehicle.

In witness whereof, I ENOS PORTER have hereunto set my hand at Shelbyville, Indiana, this 22nd day of December, A. D. one thousand nine hundred and twenty-four.

ENOS PORTER.